US012641650B2

(12) United States Patent
He et al.

(10) Patent No.: US 12,641,650 B2
(45) Date of Patent: May 26, 2026

(54) RANDOM ACCESS METHODS, TERMINAL DEVICE AND NETWORK DEVICE

(71) Applicant: GUANGDONG OPPO MOBILE TELECOMMUNICATIONS CORP., LTD., Dongguan (CN)

(72) Inventors: Chuanfeng He, Dongguan (CN); Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 420 days.

(21) Appl. No.: 18/330,041

(22) Filed: Jun. 6, 2023

(65) Prior Publication Data

US 2023/0328798 A1 Oct. 12, 2023

Related U.S. Application Data

(63) Continuation of application No. PCT/CN2020/134644, filed on Dec. 8, 2020.

(51) Int. Cl.
*H04W 74/0833* (2024.01)
*H04W 74/00* (2009.01)
*H04W 74/0836* (2024.01)

(52) U.S. Cl.
CPC ..... *H04W 74/0833* (2013.01); *H04W 74/006* (2013.01); *H04W 74/0836* (2024.01)

(58) Field of Classification Search
None
See application file for complete search history.

(56) References Cited

U.S. PATENT DOCUMENTS

| | | | | |
|---|---|---|---|---|
| 2022/0272760 A1* | 8/2022 | Murray | H04W 74/0836 | |
| 2023/0292371 A1* | 9/2023 | Rune | H04W 74/0833 | |
| 2023/0328798 A1* | 10/2023 | He | H04W 74/0833 | |
| | | | | 370/329 |

FOREIGN PATENT DOCUMENTS

| | | |
|---|---|---|
| CN | 111565448 A | 8/2020 |
| CN | 111757529 A | 10/2020 |
| CN | 111867037 A | 10/2020 |

(Continued)

OTHER PUBLICATIONS

OPPO: "Discussion on random access procedure in NTN", 3GPP Draft; R2-1909750-Discussion on Random Access Procedure in NTN, 3rd Generation Partnership Project (3GPP), Mobile Competence Centre; 650, Route Deslucioles; F-06921 Sophia-Antipolis Cedex; vol. RAN WG2, No. Prague, Czech Republic; Aug. 26, 2019-Aug. 30, 2016, Aug. 16, 2019 (Aug. 16, 2019), XP051767545, paragraph [0002]; figure 1. 3 pages.

(Continued)

*Primary Examiner* — Faiyazkhan Ghafoerkhan
(74) *Attorney, Agent, or Firm* — PERKINS COIE LLP

(57) ABSTRACT

Disclosed is a random access method, which comprises: a network device sending a first message to a terminal device, wherein the first message carries a first offset duration, and the first message comprises at least one of the following: a system message, a second MsgB and a second Msg2; and the terminal device determining a target random access resource on the basis of a backoff time and the first offset duration, wherein the target random access resource is used for initiating target random access again. Further disclosed are another random access method, terminal device and network device.

10 Claims, 11 Drawing Sheets

The terminal device determines a target random access resource based on a backoff time and a first offset duration ⟋S201

(56)  References Cited

FOREIGN PATENT DOCUMENTS

WO        2020078992 A1     4/2020
WO        2020198671 A1     10/2020

OTHER PUBLICATIONS

Interdigital (Email Discussion Rapporteur): "Summary of [Post111-e] [908] [NTN] RACH and HARQ feedback aspects", 3GPP Draft; R2-2010455, 3rd Generation Partnership Project (3GPP), Mobile Competence Centre; 650, Route Des Lucioles; F-06921 Sophia-Antipolis Cedex; France, vol. RAN WG2, No. Nov. 2, 2020-Nov. 13, 2020, Oct. 26, 2020 (Oct. 16, 2020), XP052363494, paragraph [03.1]. 49 pages.
CATT: "Discussion on Random Access Procedure for NTN", 3GPP Draft; R2-1912159, 3rd Generation Partnership Project (3GPP), Mobile Competence Centre; 650, Route Des Lucioles; F-06921 Sophia-Antipolis Cedex; France, vol. RAN WG2, No. Chongqing, P.R. China; Oct. 14, 2019-Oct. 18, 2019, Oct. 3, 2019 (Oct. 3, 2019), XP051803774, paragraph [02.2]. 8 pages.
OPPO: "Left issues on random access procedure in NTN", 3GPP Draft; R2-1913335, 3rd Generation Partnership Project (3GPP), Mobile Competence Centre; 650, Route Des Lucioles; F-06921 Sophia-Antipolis Cedex; France, vol. RAN WG2, No. Chongqing, China; Oct. 14, 2019-Oct. 18, 2019, Oct. 3, 2019 (Oct. 3, 2019), XP051804212, paragraph [0002]. 5 pages.
"3rd Generation Partnership Project; Technical Specification Group Radio Access Network; NR; Medium Access Control (MAC) protocol specification (Release 16)",3GPP Draft; 38321-G21, 3rd Generation Partnership Project (3GPP), Mobile Competence Centre; 650, Route Des Lucioles; F-06921 Sophia-Antipolis Cedex; France, Oct. 5, 2020 (Oct. 5, 2020), XP052353454, paragraph [5.1.3a]-paragraph [5.1.4a]. 153 pages.
Nokia et al: "Doppler Compensation, Uplink Timing Advance and Random Access in NTN", 3GPP Draft; R1-1913017, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, Nov. 9, 2019 (Nov. 9, 2019), XP051823750, paragraph [05.3]; figures 6-7. 28 pages.
Supplementary European Search Report in the European application No. 20964536.5, mailed on Jan. 3, 2024. 13 pages.
3GPP TSG RAN WG1 Meeting #97 R1-1907197, Reno, USA, May 13-17, 2019, Source: CAICT, Title: Considerations on Procedure for Two-step RACH, Agenda Item: 7.2.1.2, Document for: Discussion and decision.
International Search Report in the international application No. PCT/CN2020/134644, mailed on Sep. 8, 2021.
Written Opinion of the International Search Authority in the international application No. PCT/CN2020/134644, mailed on Sep. 8, 2021.
3GPP TS 38.321 V16.1.0 (Jul. 2020), 3rd Generation Partnership Project; Technical Specification Group Radio Access Network; NR; Medium Access Control (MAC) protocol specification, (Release 16).
3GPP TSG-RAN WG1 Meeting #102-e R1-2007323, e-Meeting, Aug. 17-28, 2020, Agenda Item: 8.4.1, Source: Moderator (Ericsson), Title: Feature lead summary#4 on timing relationship enhancements, Document for: Discussion.
3GPP TSG-RAN WG1 Meeting #103-e R1-2009733, e-Meeting, Oct. 26-Nov. 13, 2020, Agenda Item: 8.4.1, Source: Moderator (Ericsson), Title: Feature lead summary#4 on timing relationship enhancements, Document for: Discussion.

* cited by examiner

The terminal device determines a target random access resource based on a backoff time and a first offset duration  ⟋S201

| E | T1 | T2 | R | First offset duration | Oct 1 |

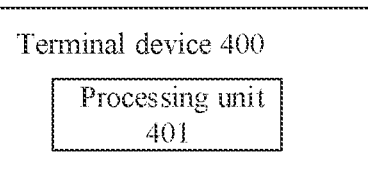
The network device transmits a first message to a terminal device, herein the first message carries a first offset duration; and the first message includes at least one of: a system message, an MsgB, or an Msg2 ⟋S301
FIG. 18
Terminal device 400
Processing unit 401
FIG. 19
Network device 500
Transmission unit 501
FIG. 20
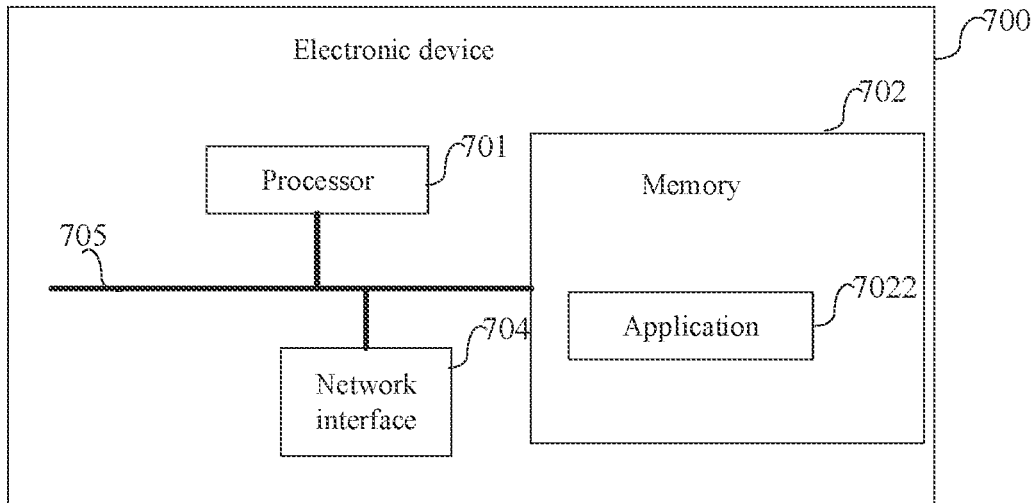
Electronic device ⟋700
Processor ⟋701
Memory ⟋702
705
Network interface ⟋704
Application ⟋7022
FIG. 21

RANDOM ACCESS METHODS, TERMINAL DEVICE AND NETWORK DEVICE

CROSS-REFERENCE TO RELATED APPLICATION

This application is a continuation application of International Patent Application No. PCT/CN2020/134644, filed on Dec. 8, 2020, the disclosure of which is hereby incorporated by reference in its entirety.

BACKGROUND

In Non-Terrestrial Network (NTN), if a random access is unsuccessful and the terminal device retransmits Message 1 (Msg1) or Message A (MsgA), how to improve the success rate of random access will be a problem to be solved.

SUMMARY

The present disclosure relates to the technical field of wireless communication, in particular to random access methods, a terminal device and a network device.

In a first aspect, the embodiments of the present disclosure provide a method for random access. The method includes: determining, by a terminal device, a target random access resource based on a backoff time and a first offset duration; herein the target random access resource is used for re-initiating a target random access.

In a second aspect, the embodiments of the present disclosure provide a method for random access. The method includes: transmitting, by a network device, a first message to a terminal device, wherein the first message carries a first offset duration; and the first message includes at least one of: a system message, a second Message B (MsgB), or a second Message 2 (Msg2).

In a third aspect, the embodiments of the present disclosure provide a terminal device. The terminal device includes a processor and a memory for storing a computer program capable of running on the processor. When the processor is used to run the computer program to determine a target random access resource based on a backoff time and a first offset duration; herein the target random access resource is used for re-initiating a target random access.

In a fourth aspect, the embodiments of the present disclosure provide a network device. The network device includes a processor and a memory for storing a computer program capable of running on the processor. When the processor is used to run the computer program to transmit a first message to a terminal device, herein the first message carries a first offset duration; and the first message includes at least one of: a system message a second MsgB, or a second Msg2.

BRIEF DESCRIPTION OF THE DRAWINGS

FIG. 18 is a flowchart of another optional procedure of a random access method provided by an embodiment of the disclosure.

FIG. 19 is a structural schematic diagram of an optional composition of a terminal device provided by an embodiment of the present disclosure.

FIG. 20 is a structural schematic diagram of an optional composition of a network device provided by an embodiment of the present disclosure.

FIG. 21 is a structural schematic diagram of the hardware composition of an electronic device provided by an embodiment of the present disclosure.

DETAILED DESCRIPTION

Figure 1:
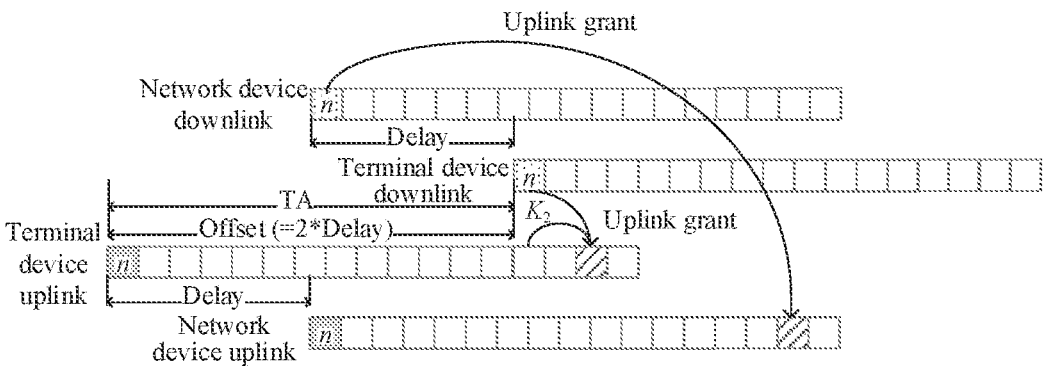
FIG. 1 is a schematic diagram of a network device carrying uplink grant to schedule Physical Uplink Shared Channel (PUSCH) transmission via Downlink Control Information (DCI) according to an embodiment of the present disclosure.

In order to enable a more detailed understanding of the features and technical content of the embodiments of the present disclosure, the implementation of the embodiments of the present disclosure will be described in detail below in conjunction with the accompanying drawings, which are provided for illustration only and are not intended to limit the embodiments of the present disclosure.

Before describing the embodiments of the present disclosure, the related contents will be briefly described.

NTN system provides communication services to terrestrial users by means of satellite communication. Compared with terrestrial cellular network communication, satellite communication has many unique advantages. First of all, satellite communication is not limited by the user's region. For example, general terrestrial communication cannot cover areas such as oceans, mountains, or deserts where communication device cannot be set up or where communication coverage is not available due to sparse population. For satellite communication, because a satellite can cover a large area of the ground and the satellite can orbit around the earth, theoretically every corner of the earth can be covered by satellite communication. Secondly, satellite communication has high social value. Remote mountainous areas, poor and backward countries or regions can be covered by satellite communication at a lower cost, so that people in these areas can profit with advanced voice communication and mobile Internet technology, thereby advantageously narrowing the digital divide with developed areas and promoting the development of these areas. Thirdly, the satellite communication distance is long, and the increase of communication distance will not significantly increase the communication cost. Finally, satellite communication has high stability and is not limited by natural disasters.

Communication satellites are divided into Low-Earth Orbit (LEO) satellites, Medium-Earth Orbit (MEO) satellites, Geostationary Earth Orbit (GEO) satellites and High Elliptical Orbit (HEO) satellites according to different orbital altitudes. LEO and GEO are briefly described as below.

The orbital height of LEO ranges from 500 km to 1500 km, and the corresponding orbital period is about 1.5 hours to 2 hours. The signal propagation delay of single hop communication between terminal devices is generally less than 20 ms. The maximum satellite visual time is 20 minutes. The signal propagation distance is short, the link loss is less, and the requirement for the transmission power of terminal device is not high.

The orbital height of MEO ranges from 8000 km to 18000 km, and the orbital period is about 5 to 10 hours. The signal propagation delay of single hop communication between terminal devices is generally less than 50 ms, and the maximum satellite visual time is generally several hours.

The orbital height of GEO is 35786 km, and its rotation period around the Earth is 24 hours. The signal propagation delay of single hop communication between terminal devices is generally 250 ms.

In order to ensure the coverage of satellites and improve the system capacity of the entire satellite communication system, the satellite covers the ground by using multiple beams, and a satellite can form dozens or even hundreds of beams to cover the ground. A satellite beam can cover the ground area with a diameter of tens to hundreds of kilometers.

Timing Advance (TA) Adjustment:

TA adjustment is required in some scenarios in NewRadio (NR) system. An important feature of uplink transmission is that different terminal devices are orthogonal in time and frequency, that is, uplink transmission from different terminal devices in the same cell will not interfere with each other. In order to ensure the orthogonality of uplink transmission and avoid intra-cell interference, the network device requires that the arrival time of signals from different terminal devices within the same subframe but different frequency domain resources (different Resource Blocks (RBs)) to the network device is basically aligned. As long as the network device receives the uplink data transmitted by the terminal device within the Cyclic Prefix (CP) range, the network device can correctly decode the uplink data. Therefore, the uplink synchronization requires that the arrival time of signals from different terminal devices within the same subframe to the network device fall within the CP. In order to ensure the time synchronization of the receiving side (network device side), both NR system and LTE system adopt Uplink (UP) TA mechanism.

The timing advance is the advance of the time when the terminal device transmits the uplink subframe compared to the time when the downlink subframe is received. By adjusting the timing advance of each terminal device, the network device can control the time when the uplink signal from different terminal devices arrives at the network device. Due to the large transmission delay, the timing advance of the terminal device far away from the network device is required to be larger than the timing advance of the terminal device close to the network device.

The network device adjusts the timing advance by transmitting a Timing Advance Command to the terminal device, and transmitting the Timing Advance Command to the terminal device by the network device may include the following two manners:

1) During the random access process, the network device determines the timing advance value by measuring the received preamble, and transmits the timing advance value to the terminal device through the timing advance Command field of the Random Access Response (RAR).

2) In the radio resource control connection state (RRC_CONNECTED), the network device needs to maintain the timing advance information. Although the terminal device and the network device obtains uplink synchronization during the random access process, the time when the uplink signal arrives at the network device may change with time, such as the terminal device in high-speed movement, and the uplink timing deviation caused by the accumulation of crystal oscillator offset of the terminal device. Therefore, the terminal device needs to constantly update its uplink timing advance to maintain uplink synchronization. The network device uses a closed-loop mechanism to adjust the uplink timing advance. The network device determines a timing advance value for each terminal device based on measuring the uplink transmission of the corresponding terminal device. Thus, the network device can be used to estimate the timing advance value as long as the terminal device has uplink transmission. Theoretically, any signal transmitted by terminal device, such as Sounding Reference Signal (SRS), Demodulation Reference Signal (DMRS), Channel Quality Indication (CQI), Feedback Message (ACK/NACK), Physical Uplink Shared CHannel (PUSCH), etc., can be used to measure timing advance. If a particular terminal device needs calibration, the network device will transmit a timing Advance Command to the terminal device and ask the terminal device to adjust the uplink transmission timing. The Timing Advance Command is transmitted to the terminal device through a Timing Advance Command MAC control element (MAC-CE). The adjustment period is controlled by a Time Alignment Timer, and the adjustment period can be 500 ms, 750 ms, 1280 ms, 1920 ms, 2560 ms, 5120 ms, 10240 ms, etc.

TA Compensation in NTN System;

For satellite communication, both downlink (link from satellite to terminal device) and uplink (link from terminal device to satellite) have significantly longer path propagation delay. For uplink transmission, TA compensation is needed to overcome the large propagation delay from the terminal device to the satellite.

When the network device instructs the uplink grant to schedule the uplink PUSCH transmission through the Downlink control information (DCI), it will carry a domain of Time Domain Resource Allocation (TDRA) in the DCI. The TDRA domain is 4 bits and can indicate 16 different rows in a resource allocation table, each row comprises different resource allocation combinations, such as indicating the starting position S, length L and k2 of the Physical Downlink Shared Channel (PDSCH). k2 denotes the number of offset slots between the slot where DCI is located and the slot where PUSCH is located. Because TA is compensated in NTN system, in fact, the slot of PUSCH transmission is in $$\left\lfloor n \cdot \frac{2^{\mu_{PUSCH}}}{2^{\mu_{PDCCH}}} \right\rfloor + k2 + \text{k\_offset},$$

where n is the slot where the terminal device receives the DCI, $\mu_{PUSCH}$ and $\mu_{PDCCH}$ represent the subcarrier spacing of PUSCH and the subcarrier spacing of PDCCH respectively, and K_offset is the compensation value of TA.

When the network device instructs downlink authorization to schedule downlink PDSCH transmission through DCI, the terminal device needs to feed back ACK/NACK after receiving PDSCH. The downlink authorization DCI may further indicate the slot position for transmitting ACK/NACK feedback information corresponding to the PDSCH and the Physical Uplink Control CHannel (PUCCH) resource. PDSCH-to-HARQ_feedback timing indicator indicates the number of slots between PDSCH and PUCCH, i.e., K1. Similarly, because TA is compensated in NTN system, in fact, the slot of the PUCCH transmission is in n+k1+K_offset, where n is the slot where the terminal device receives the DCI, and K_offset is the compensation value of TA. Similar manner is used for TA compensation of other uplink transmissions, such as PUSCH transmission scheduled by the uplink grant carried by RAR in random access process, and aperiodic SRS transmission.

The schematic diagram of the network device carrying uplink grant to schedule PUSCH transmission via DCI is as shown in FIG. 1. The network device transmits DCI to the terminal device in slot n. After receiving DCI in slot n, the terminal device obtains k2=2. Since the timing of PUSCH transmission requires an advance offset K_offset, the terminal device transmits PUSCH in slot n+k2+K_offset.

Figure 2:
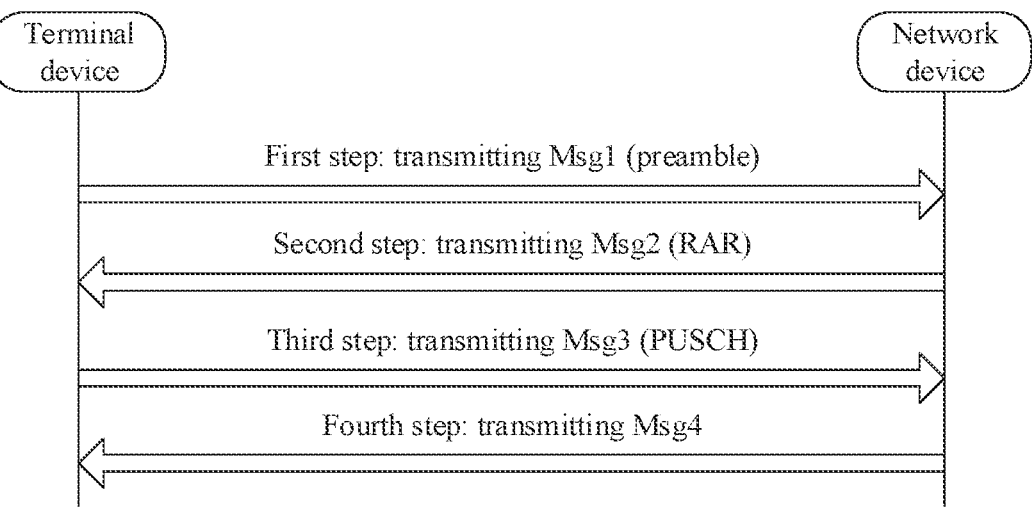
FIG. 2 is a flowchart of a procedure of four-step random access process according to an embodiment of the disclosure.

Random Access (RACH) Process:

The four-step random access process for the NR system, as illustrated in FIG. 2, includes the following steps.

In a first step, the terminal device transmits a PRACH to the network device, herein the PRACH includes a random access preamble. That is, the terminal device transmits a message 1 (Msg1) to the network device, and Msg1 carries a preamble.

In a second step, after detecting that a terminal device sends preamble, the network device sends a Random Access Response (RAR) to the terminal device. That is, the network device sends Msg2 to the terminal device to inform the terminal device of the PUSCH resource that can be used when sending Msg3, assigns a temporary Radio Network Temporary Identifier (RNTI) for the terminal device, and provides a time advance command for the terminal device.

In a third step, after receiving the RAR message, the terminal device sends an Msg3 message on the PUSCH resource designated by the RAR message, and the Msg3 message carries terminal device-specific temporary identification information.

In a fourth step, the network device sends an Msg4 message to the terminal device, which includes a contention resolution message, and allocates uplink transmission resources for the terminal device. When the terminal device receives the Msg4 sent by the network device, the terminal device detects whether terminal device-specific temporary identification information sent by the terminal device in the Msg3 is included in the contention resolution message sent by the network device. If it is included, it indicates that the random access process of terminal device is successful. Otherwise, it is considered that the random process fails, and the terminal device needs to initiate the random access process from the first step again.

The delay overhead of the four-step random access process is relatively large, which is not suitable for the low delay and high reliability scenarios in 5G system. In the standardization process of NR system, considering the characteristics of low delay and high reliability of related services, a two-step random access process, namely Type-2 random access process, is introduced in the standard version (R16), which can reduce the access delay compared with the four-step random access process. Correspondingly, the four-step random access process is referred to as Type-1 random access process.

Figure 3:
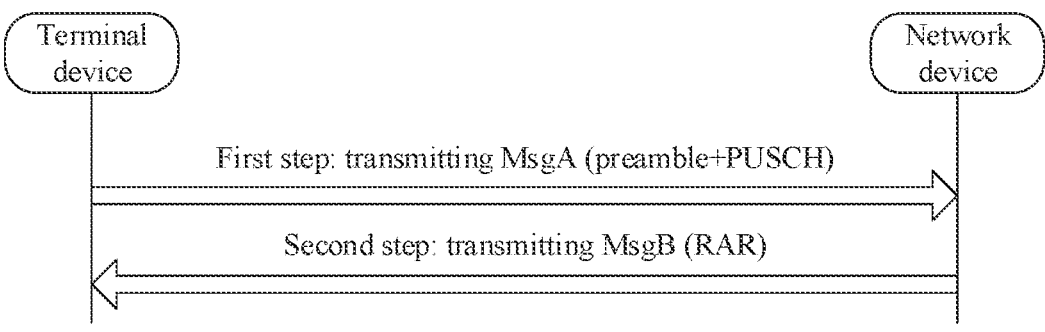
FIG. 3 is a flowchart of a procedure of two-step random access process according to an embodiment of the disclosure.

The two-step random access process of NR system, as shown in FIG. 3, is equivalent to combining the first and third steps of the four-step random access process into the first step of the two-step random access process, and the terminal device sends Msg A; and combining the second and fourth steps of the four-step random access process into the second step of the two-step random access process, the network device responds to Msg B. For the first step of the two-step random access process, Msg A includes the parts of preamble and PUSCH. For the second step of the two-step random access process, Msg B includes PDCCH and PDSCH.

For the four-step random access process, if the random access process is not successfully completed, the terminal device will retransmit Msg1. For the two-step random access process, if the random access process is not successfully completed, the terminal device will retransmit MsgA. In order to reduce collisions between Msg1 or MsgA transmissions of different terminal devices, the time of retransmitting Msg1 and MsgA needs to be performed after a backoff time. Then, in the satellite communication scenario, the related arts do not consider TA compensation for the retransmission of Msg1 or MsgA. Therefore, it is not well implemented to reduce the collision of Msg1 or MsgA transmissions of terminal devices through backoff time, which reduces the success rate of random access.

The technical solution of the embodiment of the disclosure can be applied to various communication systems, for example, global system of mobile communication (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD) system, advanced long term evolution (LTE-A) system, new radio (NR) system, evolution system of NR system, LTE-based access to unlicensed spectrum (LTE-U) system, NR-based access to unlicensed spectrum (NR-U) system, universal mobile system Telecommunication system (UMTS), World Interoperability for Microwave Access (WMAX) communication system, Wireless Local Area Network (WLAN), wireless fidelity (WiFI), next generation communication system or other communication systems.

The system architecture and the service scenario described in the embodiment of the disclosure are intended to more clearly explain the technical solution of the embodiment of the disclosure, and does not constitute a limitation to the technical solution provided by the embodiment of the present disclosure. Those ordinary skilled in the art will know that the technical solution provided by the embodiment of the present disclosure is also applicable to similar technical problems with the evolution of the network architecture and the emergence of new service scenarios.

The network device in the embodiment of the present disclosure may be a common base station (such as NodeB or eNB or gNB), an NR controller, a centralized unit, a new radio base station, a radio remote module, a micro base station, a relay, a distributed unit, a transmission reception point (TRP), a transmission point (TP) or any other device. The embodiments of the present disclosure do not limit the specific technology and the specific device form of the network device. For convenience of description in all embodiments of the present disclosure, the above-mentioned device for providing a wireless communication function for a terminal device is collectively referred to as a network device.

In an embodiment of the present disclosure, the terminal device may be any terminal, for example, the terminal device may be a user equipment for machine-like communication. That is, The terminal device can also be referred to as a user equipment (UE), a mobile station (MS), a mobile terminal, a terminal, and the like. The terminal device may communicate with one or more core networks via a radio access network (RAN). For example, the terminal device may be a mobile telephone (or "cellular" telephone), a computer with a mobile terminal, etc. For example, the terminal device may also be a portable, pocket-sized, handheld, computer-built or vehicle-mounted mobile device that exchanges language and/or data with a wireless access network. No specific limitations are made in the embodiments of the present disclosure.

Optionally, the network device and terminal device can be deployed on land, including indoor or outdoor, hand-held or vehicle-mounted; and can also be deployed on the water surface; and can also be deployed on airplanes, balloons and artificial satellites in the air. Embodiments of the present disclosure do not limit the application scenarios of the network device and terminal device.

Optionally, the communication between the network device and the terminal device and the communication between the terminal device and the terminal device may be performed through the licensed spectrum, the unlicensed spectrum, or both the licensed spectrum and the unlicensed spectrum. The communication between the network device and terminal device, as well as the communication between the terminal device and terminal device, can be performed through frequency spectrum below 7 gigahertz (GHz), or above 7 GHz, and can also be performed by using frequency spectrum below 7 GHz and frequency spectrum above 7 GHz at the same time. Embodiments of the present disclosure do not limit the spectrum resource used between the network device and the terminal device.

Generally, the conventional communication system supports a limited number of connections and is easy to be implemented. However, with the development of communication technology, mobile communication system will not only support conventional communication, but also support, for example, device to device (D2D) communication, machine to machine (M2M) communication, machine type communication (MTC), vehicle to vehicle (V2V) communication, etc. Embodiments of the present disclosure can also be applied to these communication systems.

Figure 4:
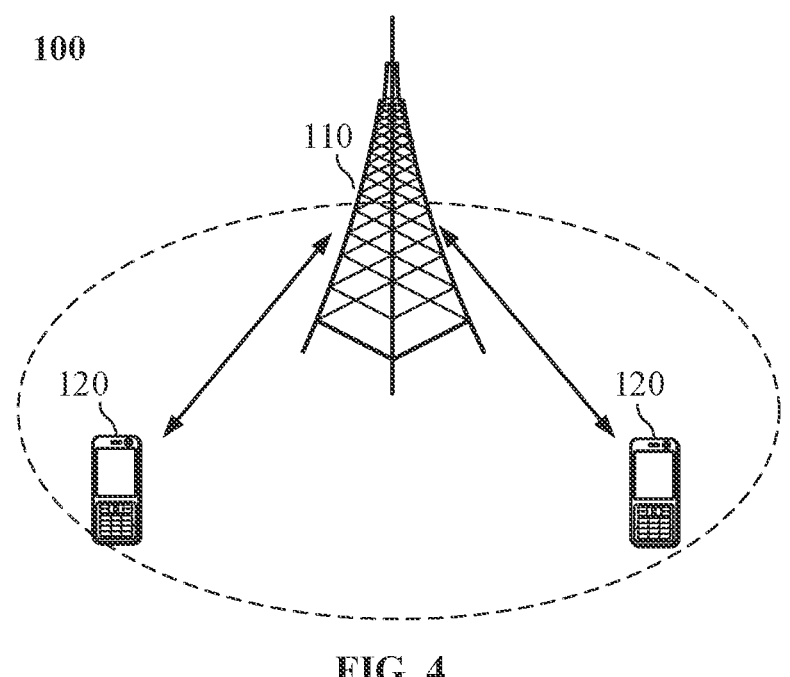
FIG. 4 is a structural schematic diagram of the composition of a communication system according to an embodiment of the present disclosure.

Exemplarily, the communication system 100 applied in the embodiments of the present disclosure is shown in FIG. 4. The communication System 100 may include a Network Device 110 which may be a device that communicates with a terminal device 120 (or referred to as a communication terminal or terminal). The network device 110 may provide communication coverage for a particular geographic area and may communicate with terminal devices located within the coverage area. Alternatively, the network device 110 may be a Base Transceiver Station (BTS) in a GSM system or a CDMA system, may also be a base station (NodeB, NB) in a WCDMA system, may also be an evolved base station (Evolution Node B, eNB or eNodeB) in an LTE system, or a wireless controller in a Cloud Radio Access Network (CRAN), or the network device can be a mobile switching center, relay station, access point, vehicle-mounted equipment, wearable equipment, hub, switch, bridge, router, network-side device in a 5G network or network device in a future evolved Public Land Mobile Network (PLMN), etc.

The communication system 100 also includes at least one terminal device 120 located within the coverage area of the network device 110. A "terminal device" used herein includes, but is not limited to, an apparatus arranged to receive/transmit a communication signal through a wired line connection, such as through Public Switched Telephone Network (PSTN), Digital Subscriber Line (DSL), digital cable and direct cable connections, and/or another data connection/network, and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or a device of another terminal device arranged to receive/transmit the communication signal, and/or an Internet of Things (IoT) device. The terminal device arranged to communicate through a wireless interface may be referred to as a "wireless communication terminal", a "wireless terminal" or a "mobile terminal". Examples of the mobile terminal include, but are not limited to, satellite or cellular phones, Personal Communications System (PCS) terminals that can combine cellular radiotelephones with data processing, fax, and data communication capabilities, PDAs that can include radiotelephones, pagers, Internet/Intranet access, Web browsers, notebooks, calendars, and/or Global Positioning System (GPS) receivers, and conventional laptop and/or hand-held receivers or other electronic devices including radiotelephone transceivers. The terminal device may also be referred to as an access terminal, a User Equipment (UE), a subscriber unit, a subscriber station, a mobile console, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (Session Initiation Protocol, SIP) phone, a Wireless Local Loop (WLL) station, a Personal Digital Assistant (PDA), a hand-held device having a wireless communication function, a computing device or another processing device connected to a wireless modem, an onboard device, a wearable device, a terminal device in a 5G network, a terminal in a PLMN in future evolution, or the like.

Alternatively, Device to Device (D2D) communication may be performed between the terminal devices 120.

Alternatively, the 5G system or 5G network may also be referred to as a New Radio (NR) system or an NR network.

FIG. 4 exemplarily illustrates one network device and two terminal devices. Alternatively, the communication system 100 may include a plurality of network devices and other numbers of terminal devices may be included within the coverage of each network device, which is not limited by embodiments of the present disclosure.

Optionally, the communication system 100 may also include other network entities, such as network controller, mobility management entity and the like, which are not limited in the embodiments of the present disclosure.

It is to be understood that a device with the communication function in a network/system in an embodiment of the present disclosure may be referred to as a communication device. Taking the communication system 100 shown in FIG. 4 as an example, the communication device may include a network device 110 and a terminal device 120 with the communication function. The network device 110 and the terminal device 120 may be specific devices described above and will not be elaborated herein. The communication device may also include other devices in the communication system 100, such as network controller, mobility management entity, and other network entities which are not limited in the embodiments of the present disclosure.

Figures 5, 6:
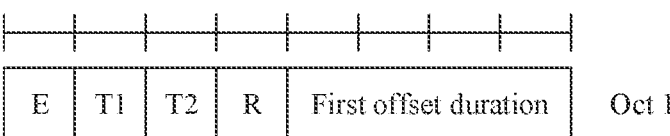
FIG. 5 is a flowchart of an optional procedure of a random access method provided by an embodiment of the disclosure.
FIG. 6 is a schematic diagram of a MAC subheader carrying a first offset duration according to an embodiment of the present disclosure.

An optional processing flow of a random access method provided by an embodiment of the disclosure is illustrated as in FIG. 5, and includes step S201.

At step S201, the terminal device determines a target random access resource based on a backoff time and a first offset duration.

The random access method provided by the embodiment of the disclosure can be applied to an NTN system. If applied in the NTN system, the first random access of the terminal device is unsuccessful, and the target random access is initiated again.

In some embodiments, the target random access resource includes: in response to that a first random access procedure is not completed, a resource for the terminal device to re-initiate the target random access. The target random access resource includes a Random Access Occasion (RO) in the target random access resource. RO is a random access resource after the first offset duration of the backoff time. For the NTN system, because both the downlink and the uplink have significantly longer path propagation delay, in order to overcome the large propagation delay of the uplink, the waiting time for the terminal device to re-initiate the target random access can be increased through the first offset time.

The backoff time can be used to determine the waiting access time for the terminal device to re-initiate the target random access in a case that the first random access is not completed. In the embodiment of the present disclosure, the waiting access time for the terminal device to re-initiate the target random access is equal to the sum of the backoff time and the first offset time. In order to avoid the collision of uplink information sent by different terminal devices in time domain, the network device indicates a PREAMBLE_BACKOFF, and the terminal device can follow a uniform distribution function or randomly select a value between 0 and PREAMBLE_BACKOFF as a backoff time. PRE-AMBLE_BACKOFF can be indicated by the header of subPDU in the RAR message sent by the network device, and PREAMBLE_BACKOFF is the Backoff Indicator (BI).

Figure 7:
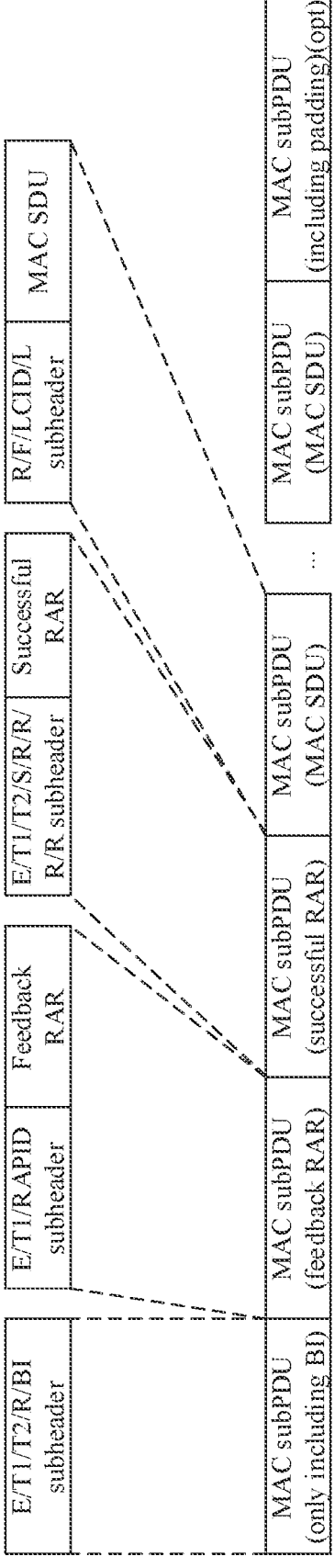
FIG. 7 is a schematic diagram of a MAC subheader serving as a MAC subPDU and included in a MAC PDU according to an embodiment of the present disclosure.
Figure 8:
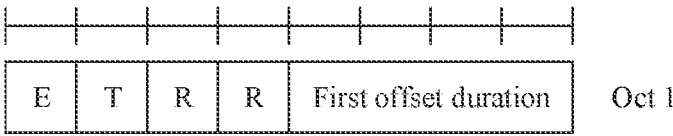
FIG. 8 is a schematic diagram of a MAC subheader serving as a MAC subPDU and included in a MAC PDU according to an embodiment of the present disclosure.
Figure 9:
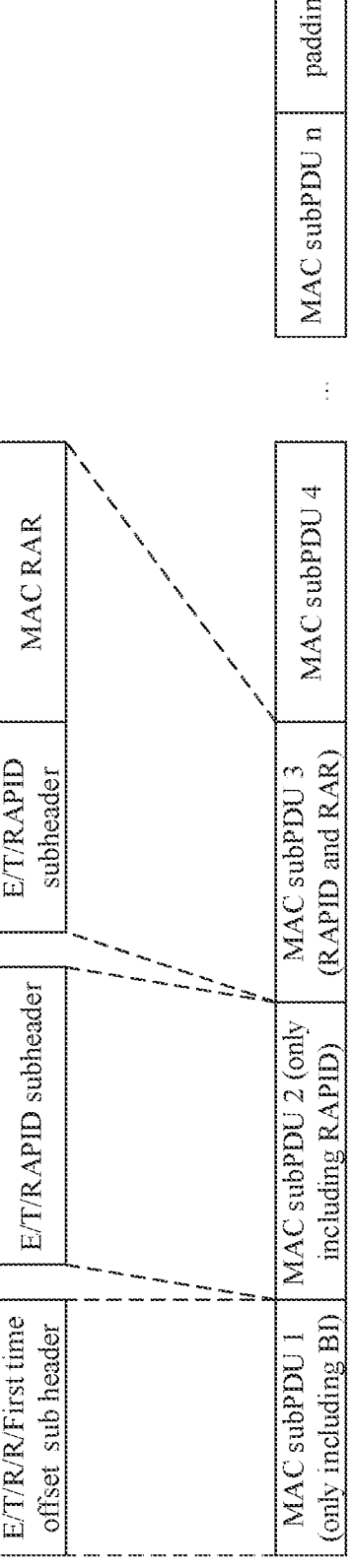
FIG. 9 is another schematic diagram of a MAC subheader serving as a MAC subPDU and included in a MAC PDU according to an embodiment of the present disclosure.

The first offset duration may be carried in at least one of the following messages: a system message transmitted by the network device, a second Msg2 transmitted by the network device, or a second Msg2 transmitted by the network device. For the two-step random access process, if the first offset duration is carried in the second MsgB, the first offset duration is carried in the MAC subheader included in the MAC PDU of the second MsgB. A schematic diagram of the MAC subheader carrying the first offset duration is illustrated in FIG. 6. A schematic diagram of the MAC subheader included in the MAC PDU as a MAC subPDU is shown in FIG. 7. For the four-step random access process, if the first offset duration is carried in the second Msg2, the first offset duration is carried in the MAC subheader included in the MAC PDU of the second Msg2. Another schematic diagram of the MAC subheader carrying the first offset duration is illustrated in FIG. 8. Another schematic diagram of the MAC subheader included in the MAC PDU as the MAC subPDU is shown in FIG. 9. The first offset duration may be a time domain unit, such as N subframes, N slots, or N symbols, etc. N is a positive integer.

In some other embodiments, the target random access resource may include: in response to that a first random access procedure is not completed, a resource for the terminal device to re-initiate the target random access. The resource with which the terminal device re-initiates the target random access may be the resource that the terminal device transmits the second Msg1 or the second MsgA. If the first random access procedure is not completed, for the four-step random access process, the terminal device may send a second Msg1 to re-initiate the target random access. For the two-step random access process, the terminal device may send a second MsgA to re-initiate the target random access. The time when the terminal device transmits a second Message 1 (Msg1) or a second Message A (MsgA) is a time corresponding to a second offset duration forward from the RO. In specific implementations, the time when the terminal device transmits the second Msg1 or the second MsgA is the time corresponding to the second offset duration forward from the start time of the random access, or may also be the time corresponding to the second offset duration forward from the end time of the random access. The second offset duration may be a time domain unit, such as N subframes, N slots, or N symbols, etc. N is a positive integer.

The second offset duration may be carried in at least one of the following information: the first offset duration, a system message transmitted by the network device, a second Msg2 transmitted by the network device, or a second Msg2 transmitted by the network device. For the two-step random access process, if the second offset duration is carried in the second MsgB, the second offset duration is carried in the MAC subheader included in the MAC PDU of the second MsgB. Similar to the schematic diagram of the MAC subheader carrying the first offset duration as illustrated in FIG. 6, a schematic diagram of the MAC subheader included in the MAC PDU as a MAC subPDU is shown in FIG. 7. For the four-step random access process, if the second offset duration is carried in the second Msg2, the second offset duration is carried in the MAC subheader included in the MAC PDU of the second Msg2. Similar to the schematic diagram of the MAC subheader carrying the first offset duration as illustrated in FIG. 8. A schematic diagram of the MAC subheader included in the MAC PDU as the MAC subPDU is shown in FIG. 9.

The second offset duration may also be determined through the first offset duration. In specific implementation, the second offset duration may be equal to the first offset duration, or the second offset duration is equal to a sum of the first offset duration and a compensation value, or the second offset duration is equal to a difference between the first offset duration and the compensation value.

In some embodiments, a case where the first random access is not completed may be that: if in the first random access process, after the terminal device sends the first Msg1, the RAR time window expires, the terminal device does not receive the RAR message matching with the preamble in the first Msg1 sent by the terminal device, and the times that the terminal device sends the preamble does not reach the maximum transmission times, the random access process is determined to be not completed. The case where the first random access is not completed may also be that: in the four-step random access process, the terminal device sends the first Msg1 to the network device and receives the first Msg2 sent by the network device; after sending the first Msg3, the terminal device starts a random access contention resolution timer (ra-ContentionResolutionTimer); and if the conflict resolution is not successfully completed when the ra-ContentionResolutionTimer expires, the random access process is determined to be not completed. The case that the first random access is not completed may also be that: in the two-step random access process, after the terminal device transmits the first MsgA, the first MsgB is not successfully received when the first MsgB response time window expires, then the random access process is determined to be not completed.

In an embodiment of the present disclosure, the first offset duration and/or the second offset duration are used to compensate for TA. Embodiments of the present disclosure are described in detail below for different scenarios in the two-step random access process and the four-step random access process, respectively.

First Scenario

Figure 10:
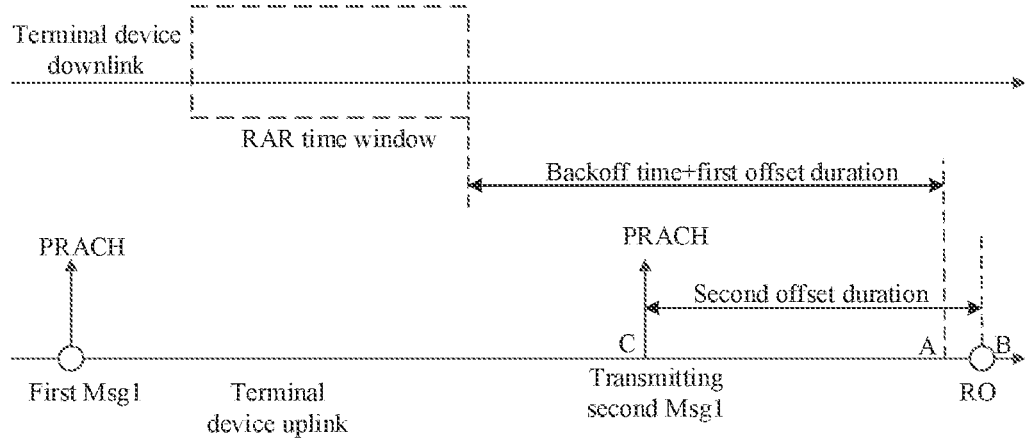
FIG. 10 is an optional schematic diagram of a terminal device transmitting a second Msg1 according to an embodiment of the disclosure.

During the four-step first random access process, after the terminal device sends the first Msg1, if the RAR time window expires, the terminal device does not receive the RAR message matching with the preamble in the first Msg1 sent by the terminal device, and the times that the terminal device sends the preamble does not reach the maximum transmission times, the random access process is determined to be not completed. The terminal device may re-initiate the target random access. In an embodiment of the present disclosure, an optional schematic diagram that the terminal device re-initiates the target random access is illustrated in FIG. 10. The terminal device determines that the RO for random access channel retransmission is the random access resource after the first offset duration of the backoff time. The first offset duration is denoted with TA_offset1, then the RO for random access channel retransmission is located after the time domain resource that is offset forward from the end time of the RAR time window by (backoff time+TA_offset1). As illustrated in FIG. 10, the time domain resource which is offset forward from the end time of the RAR time window by (backoff time+TA_offset1) is located at position A, and RO is located at position B after position A. After determining the RO, the terminal device may determine that the time of transmitting the second Msg1 in the re-initiated random access process is the time corresponding to the second offset duration backward from RO, and the second offset duration is denoted with TA_offset2. Then, as illustrated in FIG. 10, the time when the terminal device transmits the second Msg1 is the time of the position C that is offset backward by TA_offset2 from the position B.

In the embodiment of the present disclosure, transmitting the second Msg1 can also be understood as retransmitting the first Msg1.

Figure 11:
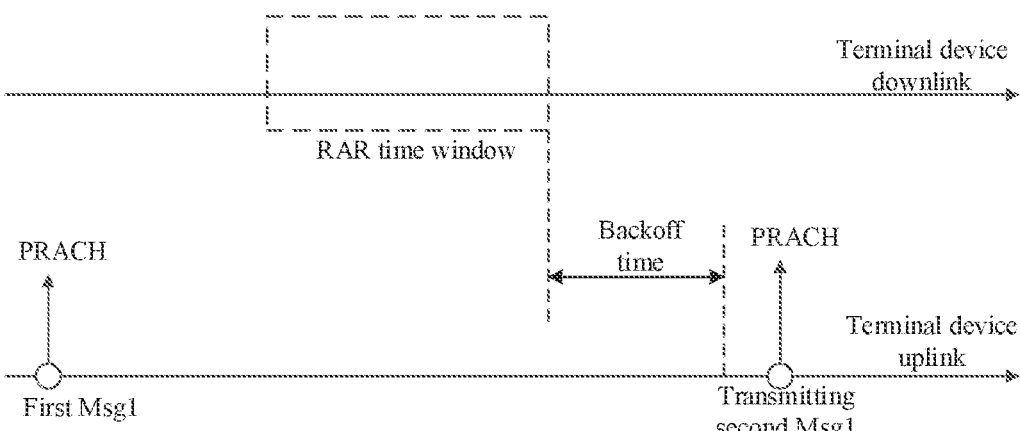
FIG. 11 is an optional schematic diagram of a terminal device transmitting a second Msg1 according to the related art.

In the same scenario as in FIG. 10, an optional schematic diagram that the terminal device transmits the second Msg1 in the related art is shown in FIG. 11. The terminal device determines that the RO for re-initiating the target random access is located after the backoff time forward from the end time of the RAR time window.

Second Scenario

Figure 12:
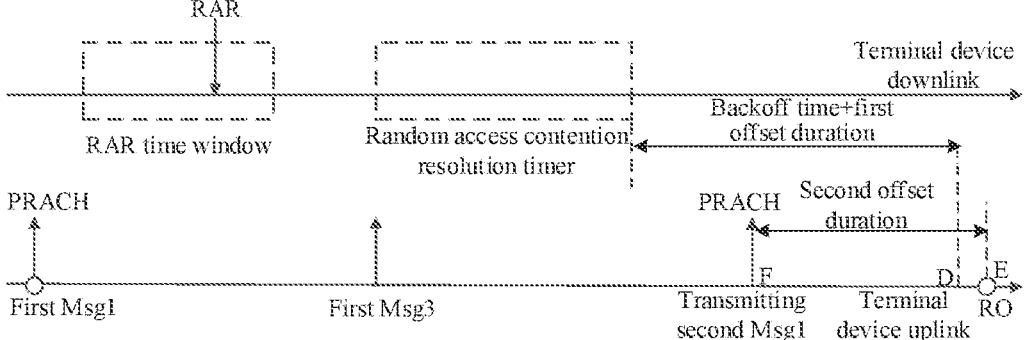
FIG. 12 is another optional schematic diagram of a terminal device transmitting a second Msg1 according to an embodiment of the disclosure.

In the four-step first random access process, the terminal device sends the first Msg1 to the network device and receives the first Msg2 sent by the network device. After sending the first Msg3, the terminal device starts a ra-ContentionResolutionTimer, if the conflict resolution is not successfully completed when the ra-ContentionResolutionTimer expires; and after sending the first Msg3, if the conflict resolution is not successfully completed when the ra-ContentionResolutionTimer expires after the terminal device sends the first Msg3, the random access process is determined to be not completed. The terminal device may re-initiate the target random access and send the second Msg1. In an embodiment of the present disclosure, another optional schematic diagram that the terminal device transmits the second Msg1 is illustrated in FIG. 12. The terminal device determines that the RO for re-initiating the target random access is a random access resource after the first offset duration of the backoff time. The first offset duration is denoted with TA_offset1, then the RO for re-initiating the target random access is located after the time domain resource which is offset forward from the end time of the RAR time window by (backoff time+TA_offset1). As shown in FIG. 12, the time domain resource which is offset forward from the end time of the ra-ContentionResolutionTimer by (backoff time+TA_offset1) is located at position D, and RO is located at position E after position D. After determining the RO, the terminal device may determine that the time of transmitting the second Msg1 is the time corresponding to the second offset duration backward from RO, the second offset duration is denoted with TA_offset2. Then, as illustrated in FIG. 12, the time of transmitting the second Msg1 in the random access process re-initiated by the terminal device is the time of the position F which is offset backward from the position E by TA_offset2.

In the embodiment of the present disclosure, transmitting the second Msg1 can also be understood as retransmitting the first Msg1.

Figure 13:
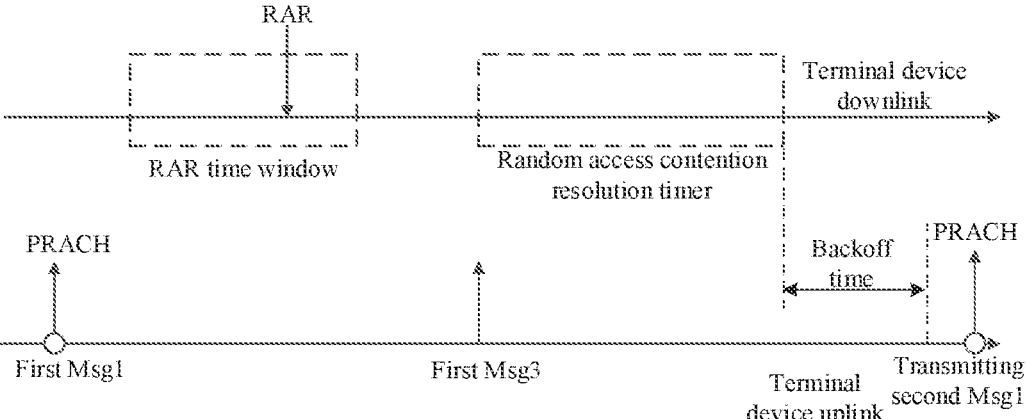
FIG. 13 is another optional schematic diagram of a terminal device transmitting a second Msg1 according to the related art.

In the same scenario as in FIG. 12, another optional schematic diagram that the terminal device transmits the second Msg1 in the related art is shown in FIG. 13. The terminal device determines that the RO for re-initiating the target random access is located after the backoff time forward from the end time of ra-ContentionResolutionTimer.

Compared with the random access process in the related technology, in the first and second scenarios of the embodiments of the present disclosure, when the first random access process is not successfully completed, the waiting time for the terminal device to re-initiate the target random access is the sum of the backoff time and the first offset duration, and the first offset duration is added on the basis that the waiting time is the backoff time in the related art. Further, when determining the time of transmitting the second Msg1 in the re-initiated random access process, TA compensation is also considered for large propagation delay in the NTN system by using the second offset duration. Thus, it is possible to ensure that the determined random access resource for transmitting the second Msg1 is an effective random access resource after TA compensation, to reduce collisions in the time domain when different terminal devices transmit the Msg1, and to improve the success rate of random access.

Third Scenario

Figure 14:
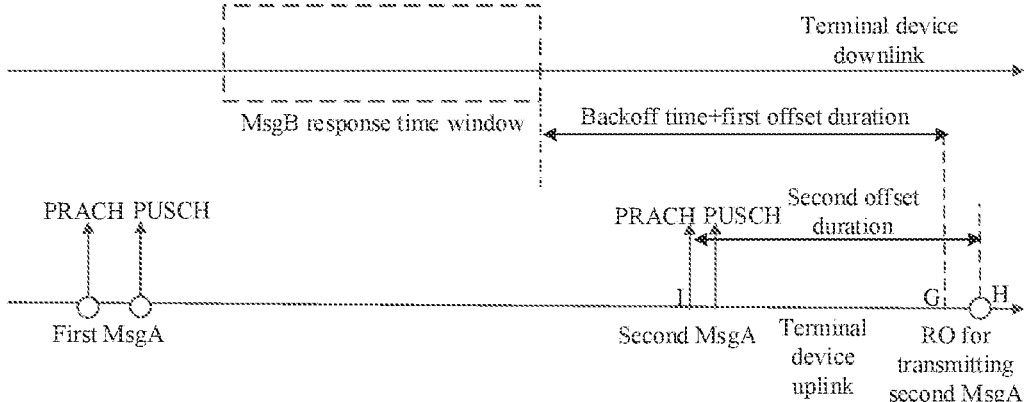
FIG. 14 is an optional schematic diagram of a terminal device transmitting a second MsgA according to an embodiment of the disclosure.

In the two-step random access process, during the first random access process, after the terminal device sends the first MsgA, if the MsgB-Response Window configured by the high layer expires and the terminal device does not successfully receive the MsgB, the terminal device determines that the first random access is not completed, and the terminal device can re-initiate the target random access. In the embodiment of the present disclosure, an optional schematic diagram that the terminal device sends the second MsgA is illustrated in FIG. 14. The terminal device determines that the RO for re-initiating the target random access is located after the first offset duration of the backoff time from the end time of the MsgB-Response Window. The first offset duration is denoted with TA_offset1, then the RO for re-initiating the target random access is located after the time domain resource which is offset forward from the end time of MsgB-Response Window by (backoff time+TA_offset1). As illustrated in FIG. 14, the time domain resource which is offset forward from the end time of MsgB-Response Window by (backoff time+TA_offset1) is located at position G, and RO is located at position H after position G. After determining the RO, the terminal device may determine that the time of transmitting the second MsgA in the re-initiated random access process is the time corresponding to the second offset duration backward from RO, the second offset duration is denoted with TA_offset2. Then, as illustrated in FIG. 14, the time when the terminal device transmits the second MsgA is the time of the position I that is offset backward by TA_offset2 from the position H.

In the embodiment of the present disclosure, transmitting the second MsgA can also be understood as retransmitting the first MsgA.

Figure 15:
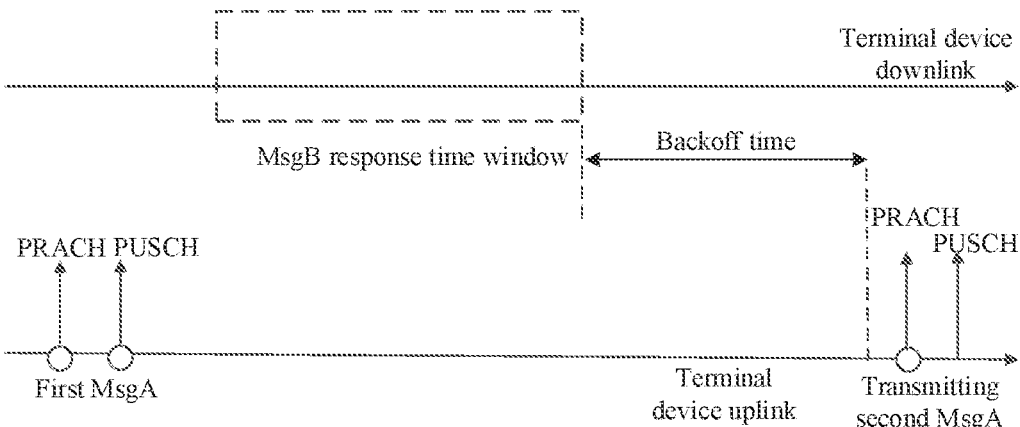
FIG. 15 is an optional schematic diagram of a terminal device transmitting a second MsgA according to the related art.

In the same scenario as in FIG. 14, an optional schematic diagram that the terminal device transmits a second MsgA in the related art is illustrated in FIG. 15. The terminal device determines that the RO for re-initiating the target random access is located after the backoff time forward from the end time of the MsgB-Response Window.

Fourth Scenario

Figure 16:
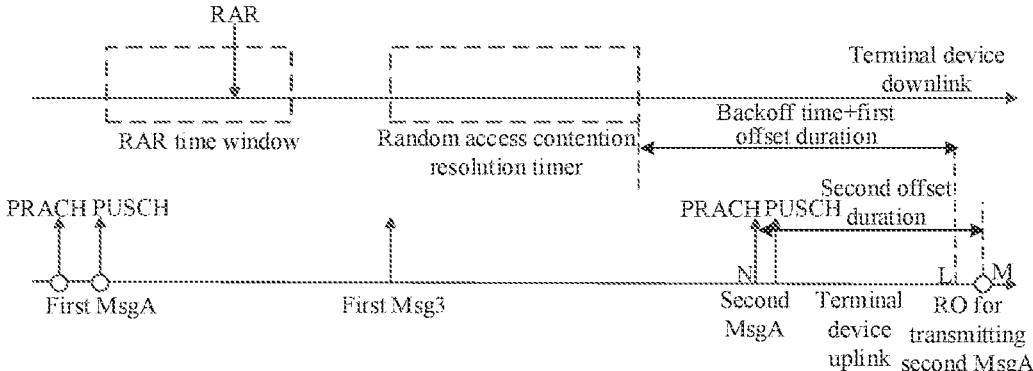
FIG. 16 is another optional schematic diagram of a terminal device transmitting a second MsgA according to an embodiment of the disclosure.

In the two-step first random access process, after the terminal device sends the first MsgA, the received first MsgB carries the feedback (fallback) RAR, the terminal device needs to send the first Msg3, and starts the ra-ContentionResolutionTimer after the first Msg3 is sent. If the ra-ContentionResolutionTimer expires, the terminal device determines that the first random access process is not completed, and the terminal device can re-initiate the target random access and send the second MsgA. In an embodiment of the present disclosure, another optional schematic diagram that the terminal device transmits the second MsgA is illustrated in FIG. 16. The terminal device determines that the RO for re-initiating the target random access is a random access resource after the first offset duration of the backoff time. The first offset duration is denoted with TA_offset1, then the RO for re-initiating the target random access is located after the time domain resource which is offset forward from the end time of ra-ContentionResolutionTimer by (backoff time+TA_offset1). As illustrated in FIG. 16, the time domain resource which is offset forward from the end time of the ra-ContentionResolutionTimer by (backoff time+

TA_offset1) is located at position L, and RO is located at position M after position L. After determining the RO, the terminal device may determine that the time of transmitting the second MsgA in the re-initiated random access process is the time corresponding to the second offset duration backward from RO, the second offset duration is denoted with TA_offset2. Then, as illustrated in FIG. 16, the time when the terminal device transmits the second MsgA is the time of the position I that is offset backward by TA_offset2 from the position M.

In the embodiment of the present disclosure, transmitting the second MsgA can also be understood as retransmitting the first MsgA.

Figure 17:
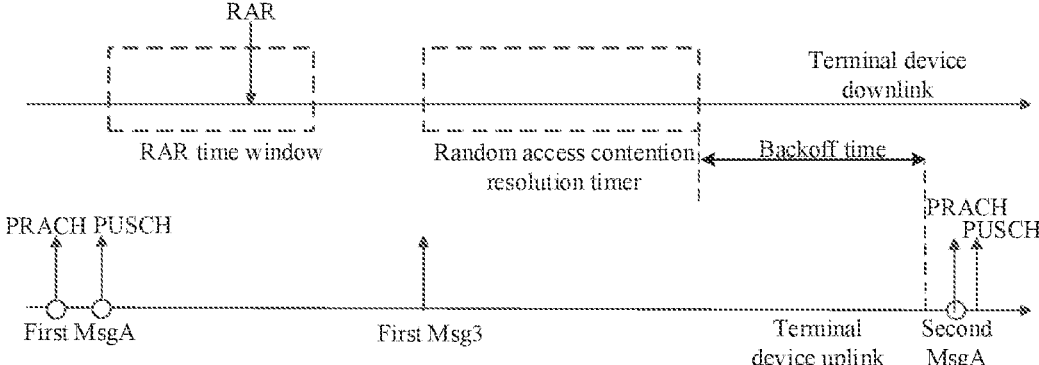
FIG. 17 is another optional schematic diagram of a terminal device transmitting a second MsgA according to the related art.

In the same scenario as in FIG. 16, another optional schematic diagram that the terminal device transmits the second MsgA in the related art is shown in FIG. 17. The terminal device determines that the RO for re-initiating the target random access is located after the backoff time forward from the end time of ra-ContentionResolutionTimer.

Compared with the random access process in the related technology, in the third and fourth scenarios of the embodiments of the present disclosure, when the first random access process is not successfully completed, the waiting time for the terminal device to re-initiate the target random access is the sum of the backoff time and the first offset duration, and the first offset duration is added on the basis that the waiting time is the backoff time in the related art. Further, the terminal device re-initiates the target random access when transmitting the random access resource of the second MsgA in the re-initiated random access process, and when determining the time of transmitting the second MsgA in the re-initiated random access process, TA compensation is also considered for large propagation delay in the NTN system by using the second offset duration. Thus, it is possible to ensure that the determined random access resource for transmitting the second MsgA is an effective random access resource after TA compensation, to reduce collisions in the time domain when different terminal devices transmit the MsgA, and to improve the success rate of random access.

Another optional processing flow of a random access method provided by an embodiment of the disclosure is illustrated as in FIG. 18. The method includes step S301.

At step S301, the network device transmits a first message to a terminal device, herein the first message carries a first offset duration; and the first message includes at least one of: a system message, an MsgB, or an Msg2.

In some embodiments, the first offset duration is used for the terminal device to determine a target random access resource.

In the embodiment of the present disclosure, the process that the terminal device determines the target random access resource based on the first offset duration is the same as the process that the terminal device determines the target random access resource in the above step S201, and will not be elaborated herein.

In the embodiment of the present disclosure, the description for the first message and the first offset duration value is the same as the description for the first message and the first offset duration value in the above step S201, and will not be elaborated herein.

It is to be understood that, in various embodiments of the present disclosure, the size of the sequence number of the above-described processes does not mean the sequence of execution, and the execution order of each process should be determined by its function and inherent logic, and should not limit the implementation of the embodiments of the present disclosure.

In order to implement the random access method provided by the embodiments of the disclosure, the embodiments of the disclosure further provides a terminal device. The optional composition structure of the terminal device 400 is illustrated in FIG. 19, and the terminal device includes a processing unit 401.

The processing unit 401 is configured to determine a target random access resource based on a backoff time and a first offset duration; wherein the target random access resource is used for re-initiating a target random access.

In some embodiments, the target random access resource includes: RO.

In some embodiments, the RO in the target random access resource is a random access resource after the first offset duration of the backoff time.

In some embodiments, the first offset duration is carried in at least one of the following messages: a system message transmitted by the network device, a second MsgB transmitted by the network device, or a second Msg2 transmitted by the network device.

Therefore, in the embodiment of the present disclosure, the terminal device may further include a receiving unit for receiving the second MsgB or the second Msg2.

In some embodiments, the first offset duration is carried on a MAC subheader comprised in an MAC PDU of the second MsgB or the second Msg2.

In some embodiments, in response to that both the system message and the second MsgB carry a first offset value, the first offset value carried in the second MsgB is determined as the first offset duration.

In some embodiments, in response to that both the system message and the second Msg2 carry a first offset value, the first offset value carried in the second Msg2 is determined as the first offset duration.

In some embodiments, the target random access resource includes: in case where a first random access process is not completed, a resource for the terminal device to re-initiate the target random access.

In some embodiments, the target random access resource includes: a resource that the terminal device retransmits a second Msg1 or a second MsgA.

In some embodiments, the time when the terminal device retransmits a second Msg1 or a second MsgA is a time corresponding to a second offset duration backward from the RO.

In some embodiments, the second offset duration is determined according to at least one of the following information: the first offset time, a system message transmitted by the network device, a second MsgB transmitted by the network device, or a second Msg2 transmitted by the network device.

In some embodiments, the second offset duration is equal to the first offset duration, or the second offset duration is equal to a sum of the first offset duration and a compensation value, or the second offset duration is equal to a difference between the first offset duration and the compensation value.

In some embodiments, the second offset duration is carried on a MAC subheader comprised in an MAC PDU of the second MsgB or the second Msg2.

In some embodiments, in response to that both the system message and the second MsgB carry a second offset value, the first offset value carried in the second MsgB is determined as the first offset duration.

In some embodiments, in response to that both the system message and the Msg2 carry a second offset value, the first offset value carried in the second Msg2 is determined as the first offset duration.

In some embodiments, the first offset duration and/or the second offset duration are used to compensate for TA.

In some embodiments, the target random access method is applied to the NTN.

In order to implement the random access method provided by the embodiments of the disclosure, the embodiments of the disclosure further provides a network device. The optional composition structure of the network device 500 is illustrated in FIG. 20, and the terminal device includes a transmission unit 501.

The transmission unit 501 is configured to transmit a first message to a terminal device, herein the first message carries a first offset duration; and the first message includes at least one of: a system message a second MsgB, or a second Msg2.

In some embodiments, the first offset duration is used for the terminal device to determine a target random access resource; and the target random access resource is used for initiating a target random access.

In some embodiments, the target random access resource includes: RO.

In some embodiments, the RO in the target random access resource is a random access resource after the first offset duration of the backoff time.

In some embodiments, the target random access resource includes: in case where a first random access process is not completed, a resource for the terminal device to re-initiate the target random access.

In some embodiments, the target random access resource includes: a resource that the terminal device transmits a second Msg1 or a second MsgA.

In some embodiments, the time when the terminal device transmits a second Msg1 or a second MsgA is a time corresponding to a second offset duration backward from the RO.

In some embodiments, the second offset duration is determined from the first offset duration; or the second offset duration is determined from the first information.

In some embodiments, the second offset duration is equal to the first offset duration, or the second offset duration is equal to a sum of the first offset duration and a compensation value, or the second offset duration is equal to a difference between the first offset duration and the compensation value.

In some embodiments, the second offset duration is carried on a MAC subheader comprised in an MAC PDU of the second MsgB or the second Msg2.

In some embodiments, in response to that both the system message and the second MsgB carry a second offset value, the first offset value carried in the second MsgB is determined as the first offset duration.

In some embodiments, in response to that both the system message and the second Msg2 carry a second offset value, the first offset value carried in the second Msg2 is determined as the first offset duration.

In some embodiments, the target random access resource is used for the retransmission of the random access channel in the case that the random access process is not completed.

In some embodiments, the first offset duration is carried on a MAC subheader comprised in an MAC PDU of the second MsgB or the second Msg2.

In some embodiments, in response to that both the system message and the second MsgB carry a first offset value, the first offset value carried in the second MsgB is determined as the first offset duration.

In some embodiments, in response to that both the system message and the second Msg2 carry a first offset value, the first offset value carried in the second Msg2 is determined as the first offset duration.

In some embodiments, the first offset duration and/or the second offset duration are used to compensate for TA.

In some embodiments, the target random access method is applied to the NTN.

The embodiments of the present disclosure further provide a terminal device. The terminal device includes a processor and a memory for storing a computer program capable of running on the processor. When the processor is used to run the computer program, steps of the above method for random access performed by the terminal device are executed.

The embodiments of the present disclosure further provide a network device. The network device includes a processor and a memory for storing computer programs capable of running on the processor. When the processor is used to run the computer program, steps of the above method for random access performed by the network device are executed.

The embodiments of the present disclosure further provide a chip. The chip includes a processor configured to call and run a computer program from a memory, which enables a device equipped with the chip to execute the above method for random access performed by the terminal device.

The embodiments of the present disclosure further provide a chip. The chip includes a processor configured to call and run a computer program from a memory, which enables a device equipped with the chip to execute the above method for random access performed by the network device.

The embodiments of the present disclosure further provide a computer-readable storage medium having stored thereon an executable program which, when executed by a processor, implements the above method for random access performed by the terminal device.

The embodiments of the present disclosure further provide a computer-readable storage medium having stored thereon an executable program which, when executed by a processor, implements the above method for random access performed by the network device.

The embodiments of the present disclosure further provide a computer program product. The computer program product includes a computer program instruction which causes a computer to execute the above method for random access performed by the terminal device.

The embodiments of the present disclosure further provide a computer program product. The computer program product includes a computer program instruction which causes a computer to execute the above method for random access performed by the network device.

The embodiments of the present disclosure further provide a computer program. The computer program enables the computer to implement the above method for random access performed by the terminal device.

The embodiments of the present disclosure further provide a computer program. The computer program enables the computer to implement the above method for random access performed by the network device.

FIG. 21 is a structural schematic diagram of the hardware composition of an electronic device (terminal device or network device) according to the embodiment of the present disclosure. The electronic device 700 includes: at least one processor 701, a memory 702 and at least one network interface 704. The various components in the electronic device 700 are coupled together by a bus system 705. It is to be understood that the bus system 705 is used to implement connection communication between these components. In addition to a data bus, the bus system 705 further includes a power bus, a control bus and a status signal bus. However, the various buses are marked as bus system 705 in FIG. 21 for clarity.

It is to be understood that the memory 702 may be volatile memory or non-volatile memory and may also include both volatile and non-volatile memory. The non-volatile memory may be a Read-Only Memory (ROM), a Programmable ROM (PROM), an Erasable PROM (EPROM), an Electrically EPROM (EEPROM), Magnetic Random Access Memory (FRAM), Flash Memory, Magnetic Surface Memory, Optical Disk, or Compact Disc Read-Only Memory (CD-ROM). The magnetic surface memory may be Disk storage Or Magnetic tape memory. The volatile memory may be a Random Access Memory (RAM), which is used as an external cache. By way of example but not restrictive description, many forms of RAMs may be used, for example, a Static RAM (SRAM), Synchronous Static Random Access Memory (SSRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). The memory 702 described herein includes, but is not limited to, these and any other proper types of memories.

The memory 702 according to the embodiments of the present disclosure is configured to store various types of data to support the operation of the electronic device 700. Examples of such data include any computer program for operation on electronic device 700, such as application 7022. A program implementing the method of the embodiments of the present disclosure may be included in the application 7022.

The methods disclosed in the above embodiments of the present disclosure may be applied to the processor 701, or implemented by the processor 701. The processor 701 may be an integrated circuit chip, which has signal processing capability. During the implementation, the various steps of the above method may be implemented by the integrated logic circuit of hardware in processor 701 or instructions in the form of software. The processor 701 described above may be a general purpose processor, a Digital Signal Processor (DSP) or other programmable logic device, a discrete gate or transistor logic device, a discrete hardware component or the like. Processor 701 may implement or execute the methods, steps and logic block diagrams disclosed in embodiments of the present disclosure. The general purpose processor can be a microprocessor or any conventional processor. The steps of the method disclosed in combination with the embodiment of the disclosure can be directly embodied as being executed and completed by the hardware decoding processor, or be executed and completed by the combination of the hardware and software modules in the decoding processor. The software module may be located in a storage medium. The storage medium is located in a memory 702 and the processor 701 reads the information in the memory 702 to complete the steps of the aforementioned method in conjunction with the hardware.

In an exemplary embodiment, electronic device 700 may be implemented by one or more Application Specific Integrated Circuits (ASIC), DSP, Programmable Logic Device (PLD), Complex Programmable Logic Device (CPLD), FPGA, General Purpose Processor, Controller, MCU, MPU, or other electronic components to perform the foregoing methods.

The present disclosure is described with reference to flowcharts and/or block diagrams of the method, device (system) and computer program product according to the embodiments of the present disclosure. It is to be understood that each flow and/or block in the flow chart and/or block diagram, as well as combinations of the flow and/or block in the flow chart and/or block diagram, may be implemented by computer program instructions. These computer program instructions may be provided for a processor of a general purpose computer, a dedicated computer, embedded processor or other programmable data processing device to generate a machine, which enables the instructions executed through the processor of the computer or the other programmable data processing devices generate a device that implements a function specified in one or more flows of the flowcharts and/or one or more blocks of the block diagrams.

These computer program instructions may also be stored in a computer readable memory that directs a computer or other programmable data processing device to operate in a specific manner, which enables the instructions stored in the computer readable memory to generate the manufacture including instruction device. The instruction device implements the functions specified in one or more flows of the flow chart and/or one or more blocks of the block diagram.

These computer program instructions may also be loaded to the computer or other programmable data processing device, so that a series of operating steps are executed in the computer or other programmable data processing device to generate a process implemented by the computer, such that the instructions executed in the computer or other programmable data processing device provide steps for implementing the functions specified in one or more flows in the flowcharts and/or one or more blocks in the block diagrams.

It is to be understood that the terms "system" and "network" in the present disclosure are often used interchangeably herein. The term "and/or" in this specification only describes an association relationship of associated objects and represents that three relationships may exist. For example, A and/or B may represent the following three cases: only A exists, both A and B exist, and only B exists. In addition, the character "/" in the present disclosure generally means that the associated objects has an "or" relationship.

The above description is only preferred implementations of the present disclosure, and is not intended to limit the scope of protection of the present disclosure. Any modification, equivalent replacement and improvement made within the spirit and principles of the present disclosure all fall with the protection scope of the present disclosure.

The invention claimed is:

1. A method for random access, comprising:
determining, by a terminal device, a target random access resource based on a backoff time and a first offset duration; wherein the target random access resource is used for re-initiating a target random access, wherein a Random Access Occasion (RO) in the target random access resource is a random access resource after the first offset duration of the backoff time.

2. The method of claim 1, wherein the first offset duration is carried by at least one of:
a system message transmitted by a network device;
a second Message B (MsgB) transmitted by the network device; or
a second Message 2 (Msg2) transmitted by the network device.

3. The method of claim 2, wherein the first offset duration is carried in a Media Access Control (MAC) subheader comprised in an MAC Protocol Data Unit (PDU) of the second MsgB or the second Msg2.

4. A method for random access, comprising:
transmitting, by a network device, a first message to a terminal device, wherein the first message carries a first offset duration; and
the first message comprises at least one of: a system message, a second Message B (MsgB), or a second Message 2 (Msg2),
wherein the first offset duration is used for the terminal device to determine a target random access resource; and the target random access resource is used for initiating a target random access,
wherein a Random Access Occasion (RO) in the target random access resource is a random access resource after the first offset duration of a backoff time.

5. The method of claim 4, wherein the target random access resource comprises:
in case where a first random access process is not completed, a resource for the terminal device to re-initiate the target random access.

6. A terminal device, comprising a processor and a memory for storing a computer program capable of running on the processor, wherein the processor is used to run the computer program to:
determine a target random access resource based on a backoff time and a first offset duration; wherein the target random access resource is used for initiating a target random access,
wherein a Random Access Occasion (RO) in the target random access resource is a random access resource after the first offset duration of the backoff time.

7. The terminal device of claim 6, wherein the first offset duration is carried by at least one of:
a system message transmitted by a network device;
a second Message B (MsgB) transmitted by the network device; or
a second Message 2 (Msg2) transmitted by the network device.

8. The terminal device of claim 7, wherein the first offset duration is carried in a Media Access Control (MAC) subheader comprised in an MAC Protocol Data Unit (PDU) of the second MsgB or the second Msg2.

9. A network device, comprising:
a transmission unit, configured to transmit a first message to a terminal device, wherein the first message carries a first offset duration; and
the first message comprises at least one of: a system message, a second Message B (MsgB), or a second Message 2 (Msg2),
wherein the first offset duration is used for the terminal device to determine a target random access resource; and the target random access resource is used for initiating a target random access,
wherein a Random Access Channel (RACH) Occasion (RO) in the target random access resource is a random access resource after the first offset duration of a backoff time.

10. The network device of claim 9, wherein the target random access resource comprises:
in case where a first random access process is not completed, a resource for the terminal device to re-initiate the target random access.

* * * * *